Feb. 17, 1959     S. K. WELLMAN     2,873,517
METHOD OF MAKING SINTERED METAL BRAKE BLOCKS
Filed Nov. 4, 1953     5 Sheets-Sheet 1

*INVENTOR.*
SAMUEL K. WELLMAN
BY Richard H. MacCutcheon

ATTY.

Feb. 17, 1959   S. K. WELLMAN   2,873,517
METHOD OF MAKING SINTERED METAL BRAKE BLOCKS
Filed Nov. 4, 1953   5 Sheets-Sheet 2
FIG. 4
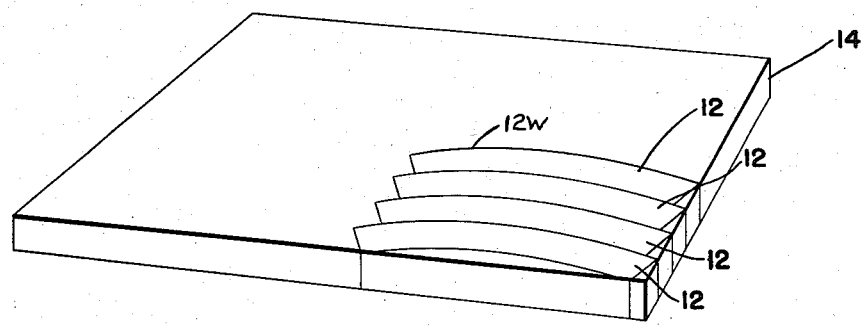
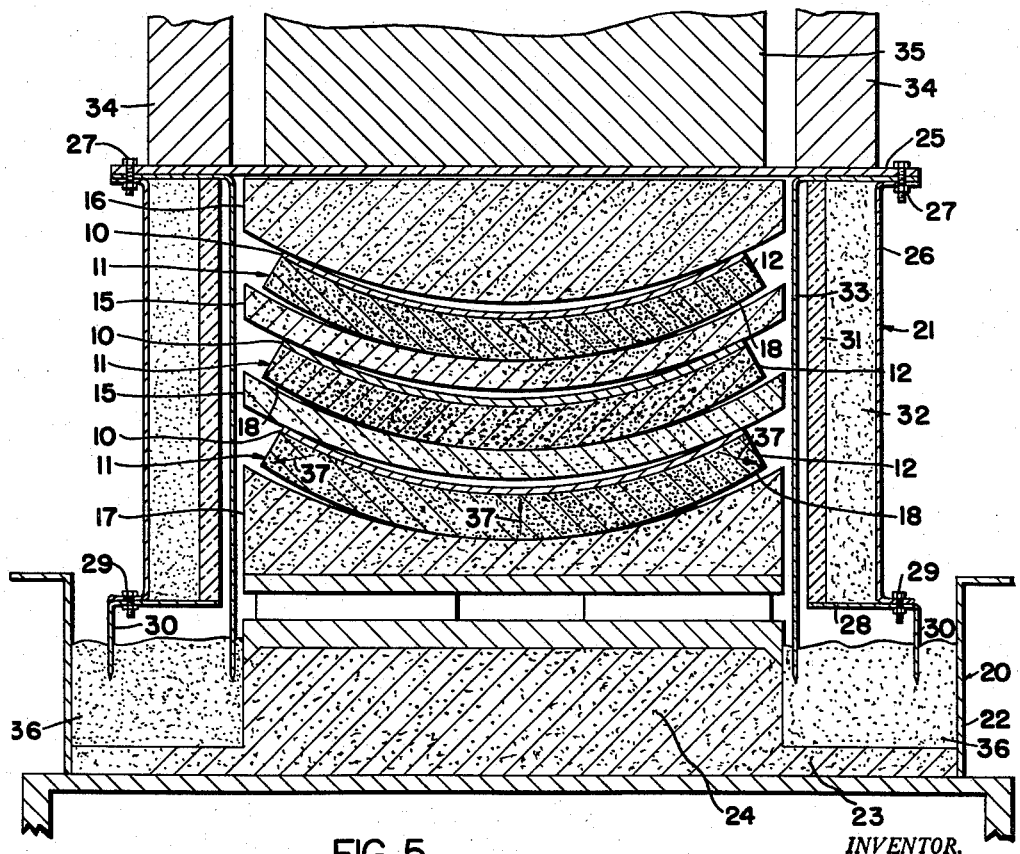
FIG. 5
INVENTOR.
SAMUEL K. WELLMAN
BY Richard H. MacCutcheon
ATTY.

Feb. 17, 1959      S. K. WELLMAN      2,873,517
METHOD OF MAKING SINTERED METAL BRAKE BLOCKS
Filed Nov. 4, 1953      5 Sheets-Sheet 3

*INVENTOR.*
SAMUEL K. WELLMAN
BY Richard H. MacCutcheon

ATTY.

Feb. 17, 1959     S. K. WELLMAN     2,873,517
METHOD OF MAKING SINTERED METAL BRAKE BLOCKS
Filed Nov. 4, 1953     5 Sheets-Sheet 4

*INVENTOR.*
SAMUEL K. WELLMAN
BY Richard H. MacCutcheon
ATTY.

INVENTOR.
SAMUEL K. WELLMAN

ATTY.

United States Patent Office 2,873,517
Patented Feb. 17, 1959

2,873,517

METHOD OF MAKING SINTERED METAL BRAKE BLOCKS

Samuel K. Wellman, Cleveland Heights, Ohio, assignor to The S. K. Wellman Company, Cleveland, Ohio, a corporation of Ohio Application November 4, 1953, Serial No. 390,178

11 Claims. (Cl. 29—420.5)

This invention relates to bi-metallic brake shoes, for example of the type comprising a curved metallic backing plate and integrally bonded thereto sintered friction material made of powdered metals predominantly. The invention also relates to methods by which such articles as well as other bi-metallic articles of curved shape may be produced, and the invention is believed to have particular significance in connection with improvements in and manufacture of brake shoes or blocks of relatively great thickness as currently used for heavy motor vehicles such as trucks, tractors and truck trailers.

Friction articles of powdered predominantly metallic material, sintered and bonded to a metallic backing member, are well known to the art and have numerous advantages over fiber facings, the sintered facings being less susceptible to changes in temperature and atmospheric conditions, less affected by oil, grease and foreign matter, and showing less wear with the same use. U. S. Patent 2,178,527, Wellman, issued Oct. 31, 1939, and Reissue Patent 22,282, Swartz, issued March 2, 1943, disclose examples of such sintered and bonded products.

Friction articles of the type referred to are produced by pressing or briquetting powders of suitable composition usually comprising metals predominantly and containing minor amounts of non-metallic ingredients such as graphite. The briquette or compact so formed is later heated to a sintering temperature, but because the metal powder even when sintered is rather porous and of low tensile strength, it is customary to provide a reinforcing backing plate of steel or of copper, and generally the sintering step is accomplished with the briquette held against a clean and properly prepared surface of the backing plate. The heat of the sintering step causes the pressed powder to sinter together and to integrally bond to the backing plate.

The necessity of pressing the powder to form a briquette and of pressing the briquette against the backing during the sintering and bonding step has heretofore seemed to complicate production of articles of curved configuration since it is difficult to press the powders to curved shape and avoid uneven pressure and density. Insofar as thinner bi-metallic articles have been concerned, for example brake shoes for passenger automobiles, satisfactory expedients in the past have involved compressing the powders in flat configuration, pressing the "compacts" so formed to a flat metal backing using heat and pressure exerted at right angles to the then flat wear face, and then pressing or roll bending to curved shape as disclosed and claimed in Patent 2,434,237, Wellman, issued Jan. 6, 1948, and Patent 2,446,891, Tower and Lowey, issued August 10, 1948. The patented methods have, however, proved unsuccessful as applied to the manufacture of relatively thick linings, for example those having a friction facing ¾" thick as required for installation on trucks, tractors and truck trailers. With either press forming or roll bending where powdered material compacts, useful as friction material for such thick linings and secured to a backing during or after sintering are subsequently bent, the compacts will crack open, it appearing that such completed articles as truck brake linings present too sharp a curve to press and too great a thickness for roll bending.

It is an object of the present invention to provide simple and inexpensive means for overcoming the above mentioned difficulties.

Another object of the invention is to provide an improved method of making a bi-metallic brake shoe which method is substantially independent of the final dimensions desired for the parts of the bi-metallic article.

A further object of the invention is to provide a novel method for producing a bi-metallic article of curved shape having a sintered facing of powdered metals predominantly and disposed on the outer or convex surface of a curved metallic backing plate, and which sintered layer is free from cracks.

Other objects and advantages will become apparent and the invention will be better understood from the following description taken in connection with the accompanying drawings, in which:

Fig. 4 is a perspective view of a rectangular shaped compact of unsintered powdered materials which may optionally be used to provide arcuate shaped flat faced sections or segments;

Fig. 5 is a central vertical section of a sintering and bonding furnace containing bi-metallic articles constructed and being processed in accordance with one aspect of the invention;

Like numbers are used for like parts throughout the drawings.

Figure 1:
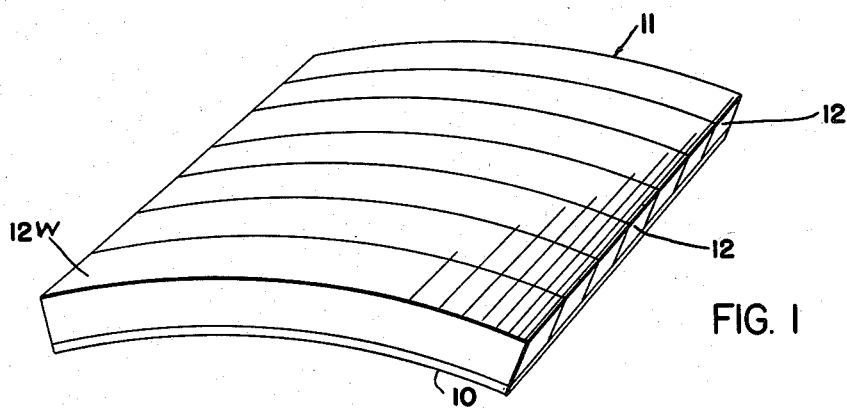
Fig. 1 is a view in perspective of an article during one step of manufacture in accordance with a method of the invention.

Referring first to Fig. 1, I have illustrated a curved bi-metallic article comprising a pre-curved backing member 10 of solid metal such as steel or copper, and a curved friction facing of powdered material and indicating generally at 11. As previously intimated, the friction facing is a mixture of powdered metallic or powdered metallic and non-metallic materials pre-mixed and compacted. In accordance with the present invention I propose taking a plurality of flat sided arcuate segments 12 and assembling them in side by side relationship to form the facing 11 upon the backing member 10. If the flat interfaces or planes between the individual arcuate segments 12 be thought of as extending arcuately and vertically, I then press segments and backing together by pressure applied vertically and I have found that the vertical pressure squeezes the segments in a transverse direction sufficiently for the vertical demarcations between the segments to disappear, or at least sufficiently for these demarcation lines to become of little or no importance because of the bonding of adjacent interfaces and of each individual segment to the metallic backing plate.

Figure 2:
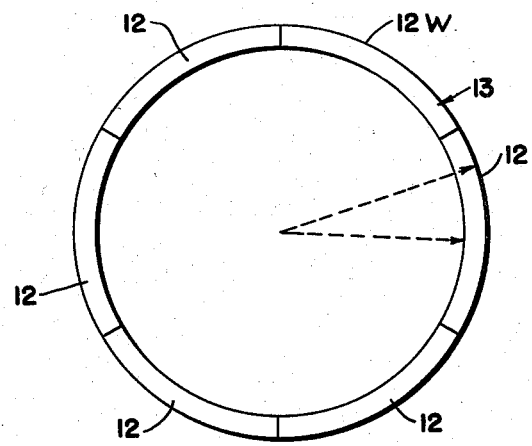
Fig. 2 is a plan view, on a reduced scale, of a ring-shaped compact of unsintered powdered materials cut in accordance with one aspect of the invention.
Figure 3:
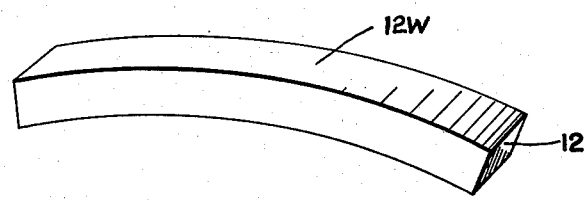
Fig. 3 is a perspective view of an arcuate segment as cut from the ring shown in Fig. 2, or which may, alternatively, have been separately and individually molded to shape as a flat faced article.

Generally speaking, the facing to be sintered and bonded to the backing plate comprises a mixture of metallic powders, such as a copper or iron base mixture, such as one comprising copper, iron, tin and lead to which minor amounts of non-metallic substances such as graphite and silica may be added. The powdered mixture is thoroughly mixed and then pressed under pressure, for example of about 11 tons per square inch, to form a flat briquette or compact. Since it is relatively easy to produce compacts of flat configuration but is difficult to press powder to a curved shape and still avoid uneven pressure and density, in accordance with the present invention, arcuate segments 12 are molded as flat stock. For example a ring shape flat compact 13 may be cut as shown in Fig. 2 to provide a plurality of flat sided arcuate segments 12 (see Fig. 3), or optionally the arcuate segments 12 may be molded individually, or they may be cut from a rectangular flat sheet-like compact 14 as shown in Fig. 4. In any event, for each segment the face width (i. e. width transverse of the arc and transverse the thickness between inner and outer arcuate surfaces) is relatively narrow compared to the face width of the completed shoe and, therefore, it is very feasible to flat compact the powders, as described, that is by compacting the powders by pressure applied in a direction parallel to the eventual wear face which may be designated 12W.

Thus, a plurality of flat faced arcuate segments are provided. These are aligned with their flat faces side by side as shown in Fig. 1 and then, as indicated in Fig. 5, they are placed in a furnace for heating and pressing by pressure applied vertically to effect sintering and afford the bond with backing plate member 10. As shown in Fig. 5 they are placed upside down (with respect to the showing in Fig. 1) in order that they may be stacked in layers with convex sides down to provide some protection against sidewise sliding and at the same time permit greater production than would be possible if there were only a single assembly (of segments and backing) within the furnace at any one time. It will be seen that within the furnace the pressure applied is at right angles to the wear face 12W or 18 at the center of its arc. Referring in detail to the construction shown in Fig. 5, the furnace comprises a base structure indicated generally at 20 and a cover structure indicated generally at 21. The base structure comprises a steel tub or pan 22 containing a heat insulating bottom lining 23 which is formed with a central cylindrical upward extension 24 designed to support the work in the furnace. The furnace cover structure 21 comprises an inverted cup shape casing of sheet steel including a leakage preventing flexible top diaphragm 25, a cylindrical side wall 26 attached to the diaphragm periphery by bolts 27, an annular bottom wall 28 secured to side wall 26 by bolts 29 and having a depending flange or skirt 30. The cover structure also has an inner side wall 31 preferably of a refractory and heat insulating material, and the space between outer side wall 26 and inner side wall 31 may be filled with a loose heat insulating material 32. In the arrangement shown, the desired air seal about the work is additionally provided by a second sheet steel wall 33.

Flexible diaphragm 25 has its periphery held in place by an annular top side wall 34 while its center is adapted to be pressed downward by a plunger or piston 35 which may be actuated by air or hydraulic pressure or by any suitable source of force (not shown). The bottom ends of skirt 30 and wall 33 are embedded in loose sand or other loose material 36 so that the side walls are adapted to move up and down while still providing a hermetic seal for the furnace despite relative movement of side wall and top diaphragm in accordance with motion of pressure applying piston 35.

The furnace is fired from a suitable source of heat (not shown) and it may of course be fed by gas or by electricity or by a combination of such means as more fully described and illustrated in U. S. Patent 2,258,431, Wellman, issued October 7, 1941, and entitled "Heat Treating Furnace."

The work to be treated in the furnace in accordance with the present invention comprises a plurality of partially finished curved bi-metallic elements such as truck brake blocks comprising curved metallic backing 10 and powdered predominantly metallic friction material segments 12 (together in each layer making up a facing 11) along with suitably interposed separators 15 which may be of graphite (or of an alloy material possessing high strength and low creep and fusion characteristics) and together with top and bottom pressure blocks 16—17, respectively, which may also be made of graphite (or of such alloy). Alternatively, instead of providing separators 15, outer faces 18 of the friction material segments 11 may be coated with a thin layer of graphite to prevent sticking to the backing member portions to which they are not supposed to adhere.

In the use of the furnace, the facing segments 12 as assembled therein may be either sintered or unsintered, but for the purpose of the present description it may be assumed that they have not been previously sintered and are merely compacted articles of friction material comprising powdered metals predominantly and with or without some non-metallic materials added to increase or decrease the coefficient of friction of the resulting mixture. For assembling the work (with or without separators, but within the furnace) the top cover 21 is first lifted off the base 20, then the work is assembled in the furnace chamber, and then the chamber is closed by replacing the cover. Under the initial condition in the furnace the stack of work is not subjected to pressure except for the moderate weight of the work itself and of the top pressure block plus any separators used.

As explained in connection with the processing of flat articles in the above mentioned Patent 2,258,431, to carry out the procedure of eliminating moisture or gases from the porous facings, the sintering of such facings, and the welding of the facings to the steel backings, the work is then subjected to heat and simultaneously to a reducing atmosphere and to pressure. In the case of curved articles of the type described the pressure may either be applied as a last step, or simultaneously with the heat providing no separators are used, or simultaneously with the heat even when it is desired to use separators providing certain precautions as hereinafter more fully described are taken to compensate for the difference of thermal expansion of the friction articles as compared to that of the material of the separators. At any event, as heating of the work in the furnace is started, some protective atmosphere is used, as through the known use of charcoal, and later a current of dry reducing gas such as hydrogen or "city" gas may be started flowing through the furnace to prevent oxidation of the powdered metals. As the temperature of the furnace is gradually increased and reaches a value of 1200° to 1300° F., sintering of the compressed powdered facings is effected. With further heating, the welding temperature lying in the range of 1350° to 1650° F. is reached, pressure may then be applied through piston 35 forcing the diaphragm 25 downward aaginst the stack of work and applying sufficient pressure, e. g. 250 pounds per square inch, to insure firm contact between the compressed powdered facings and the backing members throughout the entire extent of their contiguous surfaces thus to effect the desired weld or bond between the parts. When the weld has been effected as above described, the pressure is released (or it may be maintained during cooling), and, after the parts have been allowed to cool, the furnace may be opened and the work removed.

During the numerous experiments and tests which were required in order to complete the present invention, it was found that quite a problem was presented in attempting to apply known principles to the simultaneous heat treating and bonding of curved friction surfaces to curved backing plates. As an example of the difficulties encountered, it was found that where, as is usual for the processing of flat articles, heat was applied and pressure applied simultaneously, or soon thereafter, and where, as is usual when providing arcuate shaped segments, the radii of the two curved surfaces of each individual segment had a common center (as is Fig. 2) so that the outer radius was substantially larger than the inner radius, the friction facings would crack and break because of uneven arches and subsequent uneven pressure distribution. After much labor it was first found that the difficulty could be avoided by providing mating surfaces but only if no separators were used. Many times it is desirable to use separators of carbon or graphite but a substantially different coefficient of thermal expansion exists between such materials on the one hand and the mixtures desired for friction materials on the other. This difficulty was met by cutting, or finishing by grinding, both the inner and outer arcuate surfaces of the friction articles to eccentric radii, and, when separators are used, providing for the separators inner and outer radii which are different (by the proper amount) from the radii of the friction articles.

By way of example, an iron base mix of predetermined proportions and useful to provide a friction facing 12 may have a coefficient of thermal expansion at 20° C. of $12.5 \times 10^{-6}$ per ° C., while the coefficient of expansion of a predetermined grade of graphite (i. e., carbon and a binder) desired to be used as separators 15 may be $8 \times 10^{-6}$ per ° C., so that with heating the tendency for the sintered friction material mix to expand outwardly at its ends and inwardly at its middle, as indicated generally by the arrows 37 (Fig. 5), will be greater than that of the graphite, and the friction material will lose its curvature more rapidly than the graphite. With this condition, if the unlike materials were all finished to the same radius, and then heat and simultaneous pressure applied, the friction segments would expand and flatten and break the graphite under the pressure. I have found that one way of correcting the difficulty is to assure that the friction materials have a greater initial radius of curvature than the initial radius of curvature of the separators. The difference is not nearly so great as that indicated in Fig. 5, where the scale of the drawing in this respect had to be exaggerated for clarity, and the actual difference in practice may be only one hundredth of an inch and still serve as an adequate protection against the difficulty mentioned. Thus, for example, it may be found desirable to initially provide the friction material with an outer radius of 7.22 inches, and the friction articles (i. e., friction material and steel backing combined) with an inner radius of the same amount, while the separators have an initial radius, both inner and outer, of 7.23 inches.

Figure 6:
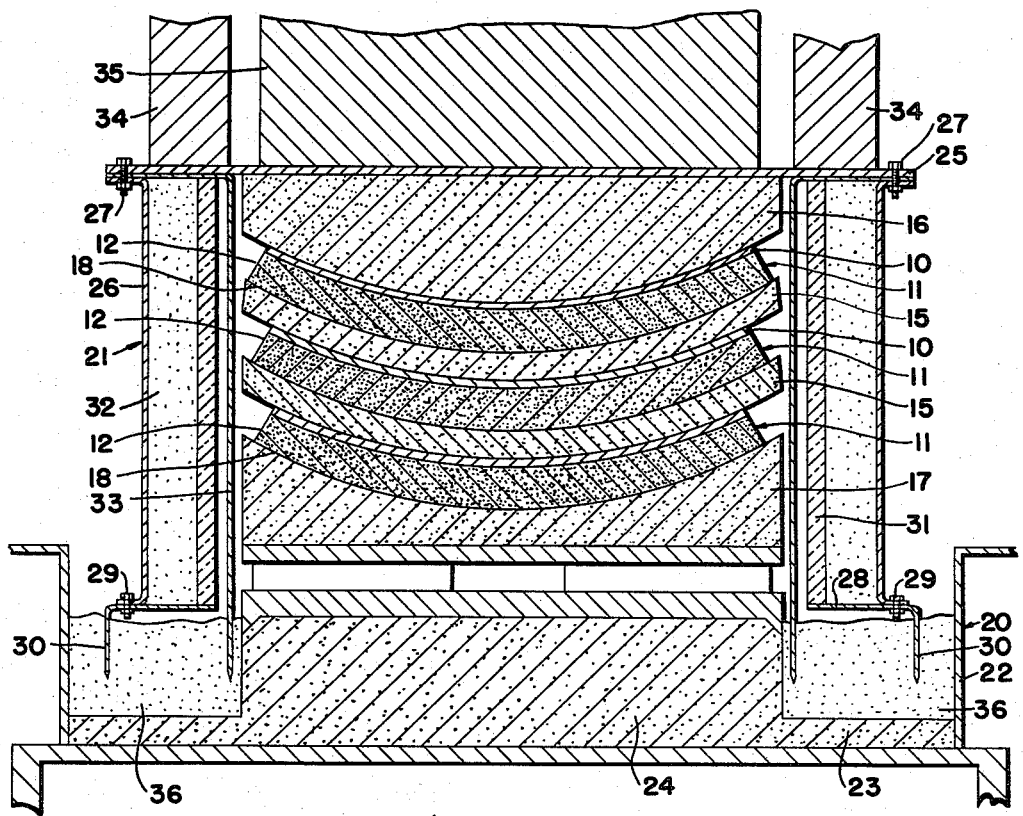
Fig. 6 is a central vertical section of a similar furnace containing bi-metallic articles constructed and being processed in accordance with another aspect of the invention.

It has also been found that in many cases the problem (of unequal expansion of graphite and friction material) can be avoided by providing mating surfaces (e. g., outer friction facing and adjacent inner arc of any separator 15') to the same concentric radii, as indicated in Fig. 6 and then holding off on the application of pressure until after the articles (and the separators) are thoroughly heated. It is to be realized, of course, that the problem was not present at all in the case of flat work, e. g. of the type described in the above mentioned Patent 2,258,431, probably because the flat separators could slide with respect to the flat friction articles, but for the processing of curved pieces in a furnace this difference in coefficient of expansion proved very troublesome.

Figure 7:
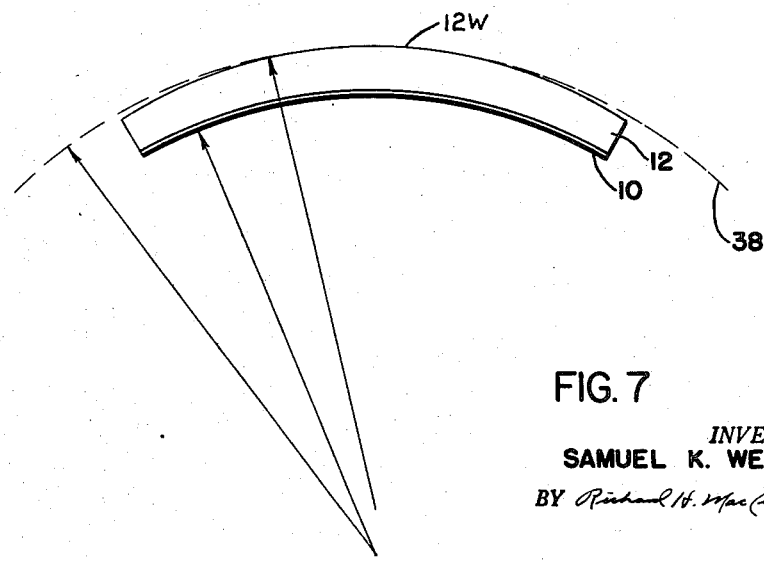
Fig. 7 is a vertical section showing a bi-metallic brake lining constructed in accordance with the arrangement of Fig. 6.

The radius of a finished friction article (i. e., when fully sintered and bonded and removed from the furnace) is not usually so critical even though, because of the hard material of the facing, it is somewhat more critical than would be the case if the facing were of fibrous material such as asbestos so that it could be readily worn-in during use. If desired the completed article may be radius ground on outer or inner surface or both to accommodate another member or members, or because finished radius is not so critical as radius in process in the furnace, like but unconcentric radii may be left as they are. Thus, as shown in Fig. 7, where a finished brake shoe 10—12 has an inner radius of 7¼ inches and an outer radius of 7¼ inches but is to be used with a brake drum having an inner diameter (as diagrammatically indicated by the dashed line 38) with this drum diameter being 16 inches corresponding to a radius of 8 inches concentric with the shoe inner radius, there will merely be small toe and heel clearances between drum and shoe. Such clearances are not usually objectionable and sometimes are even advantageous.

Figure 8:
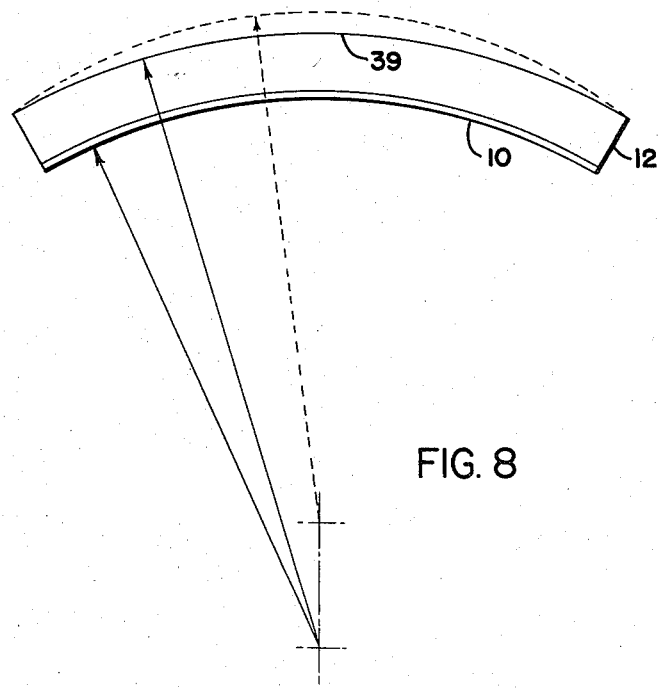
Fig. 8 shows another bi-metallic brake lining constructed in accordance with the arrangement of Fig. 6.

In Fig. 8 there is shown a friction article first made as by the process outlined in connection with Fig. 5 or Fig. 6, that is with eccentric inner and outer radii, the outer radius being first as shown by the dashed arc in Fig. 8 and then radius ground down to the wear face arc 39 concentric with the inner arc so that the inner and outer radii will be concentric for the finished article, as might be desired, for example, where an outer brake drum (not shown) and an inner brake shoe support (not shown) are to be rotatable about a common center.

Alternatively instead of allowing for thermal coefficients of expansion by providing initial unmating arches as between each friction article and separator (see Fig. 5), or holding off on pressure until the articles are thoroughly heated (as assumed in the description of Fig. 6), it is possible to meet the thermal expansion difficulty by providing separators which have a coefficient of expansion close to that of the friction material and its backing, while still having the other qualities desired for the separators; of non-sticking (unless they are to be spread or sprayed with graphite), of high strength, and low creep. Various nickel chrome alloys are suitable for this purpose, e. g. one of which by weight is 50% Fe, 35% Ni, and 15% Cr; or even 85% Ni and 15% Cr, the chrome content thus being high enough to not only provide strength but to prevent fusion with the friction articles. Such an alloy is assumed for the separators 15' as well as for top block 16' and bottom block 17' in the representation of Fig. 9. Also, as shown in Fig. 9, the friction articles initially have concentric inner and outer radii so that no final grinding will be necessary, for in Fig. 9 it is the separators 15' which have eccentric inner and outer radii resulting in their being thicker at their middles than at their ends in order to provide the mating surfaces required to present breakage when the stack of superposed arcuate separators and friction articles are subjected to the pressure required to bond the friction segments to the backings.

Figure 10:
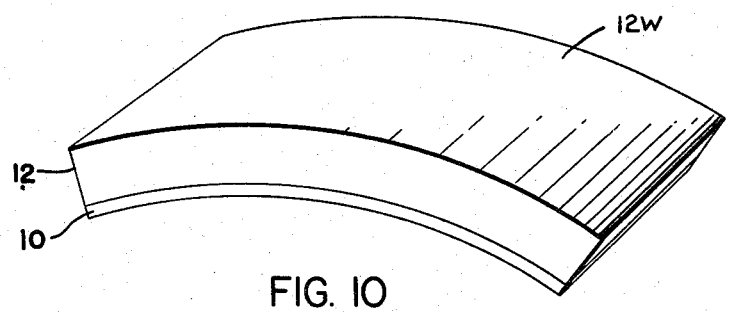
Fig. 10 shows a bi-metallic brake lining constructed in accordance with the arrangement of Fig. 9.
Figure 9:
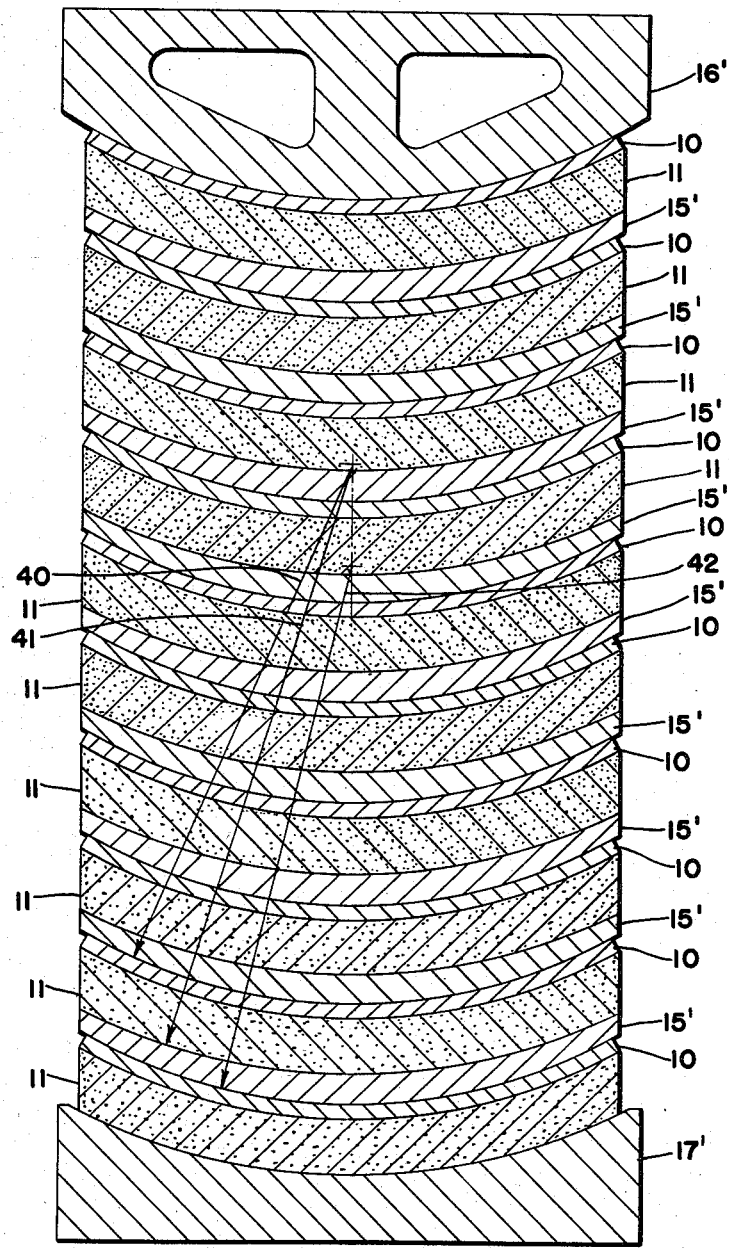
Fig. 9 shows an alternative arrangement of stacked bi-metallic articles and intervening separators.

A completed friction article 10—12 made in accordance with the arrangement of Fig. 9 is shown in Fig. 10.

There is thus provided devices and methods of the class described capable of meeting the objects above set forth. The invention overcomes the apparent impossibility of forming thick truck brake linings of sintered material and results in a homogeneous or nearly homogeneous article well able to stand up under the severe operating conditions for which it is intended.

While I have illustrated and described particular embodiments of the invention, various modifications may obviously be made without departing from the true spirit and scope thereof, and I desire it to be understood that the invention is not to be limited except by the scope of the following claims which are intended to include all reasonable equivalents.

I claim:

1. A method of making an arcuate bi-metallic brake shoe of maximum width and thickness which comprises the steps of providing powdered materials comprising metals predominantly, compacting said powders to provide narrow arcuate segments by means of pressure applied parallel to the ultimate wear faces thereof, providing a mating curved metallic backing plate, assembling the segments in juxtaposition to the backing plate, and bonding the segments to the plate by applying heat and applying pressure at right angles to the segment wear faces at the centers of their arcuate lengths.

2. A method of making thick truck brake shoes of sintered powdered material bonded to a metallic backing plate, which method comprises the steps of providing a curved metallic backing plate, providing a mixture of powdered materials containing powdered metals predominantly, pressing the powders to form at least one flat faced compact thereof, providing radially flat faced arcuate sections therefrom, placing a plurality of said arcuate sections side by side with a major portion of their flat faces engaged with each other and with their inner arcuate surfaces engaged with the outer curved surface of the backing plate, and applying heat and pressure to sinter the powdered materials and simultaneously bond the sections to said backing plate and to each other.

3. A method of manufacture of brake blocks of relatively great thickness as currently used for heavy motor vehicles such as trucks, which methods comprises the steps of providing a plurality of curved backing plates, providing a mixture of powdered materials containing powdered metals predominantly, pressing the powders to form flat faced compacts thereof, cutting from said compacts flat faced arcuate sections substantially narrower than the width of the backing plates and substantially greater in number than the number of said backing plates, placing a plurality of said arcuate sections side by side with flat faces adjacent each other and with inner arcuate surfaces adjacent the outer curved surface of each backing plate, stacking backing plates and segments in the furnace in alternately disposed relation with their convex sides down to provide against side-wise sliding, providing means to prevent sticking of alternate friction facings and backing plates, sealing the furnace to prevent introduction of atmosphere to said articles, supplying a reducing gas to the sealed enclosure, and applying heat and pressure to the work in said furnace, whereby there is provided an improved method of making such brake shoes which method is substantially independent of the thickness desired for the ultimate friction facing of powdered material mixture.

4. The method of claim 3 further characterized by said means to prevent sticking of alternate friction facings and backing plates comprising intervening separators of carbonaceous material and further characterized by the provision of means for compensating for the difference of thermal expansion coefficient of separators with respect to backing plates and segments.

5. The method of claim 3 further characterized by said means to prevent sticking comprising intervening separators of nickel chromium alloy.

6. A method of making thick bi-metallic articles such as truck brake shoes having sintered powdered metallic friction material facings which present too sharp a curve to press radially, too great a thickness for roll bending, and too wide a face width for pressing axially, which method comprises providing a plurality of precurved solid metallic backing plates, providing a mixture of powdered materials comprising powdered metals predominantly, pressing the powders to form flat faced compacts thereof with the flat faces normal the direction of application of pressure of compacting, providing flat faced arcuate sections from said compacts with the inner and outer radii of each section substantially equal to each other and to the inner and outer radii of said backing plates, providing a plurality of separator plates of arcuate configuration and of predetermined inner and outer radii determined by the necessity of having mating arches to prevent collapse due to pressure and unmating initial arches when it is necessary to compensate for varying coefficients of thermal expansion, stacking segments and backings and separators in a furnace with a plurality of segments adjacent each of the backings, applying heat and pressure and a reducing atmosphere to the articles within the furnace to bond powdered material segments to each other and to the respective backing plates, allowing the articles to cool, and removing them from the furnace.

7. The process of making truck brake blocks which includes the steps of providing a plurality of solid metallic backing members of curved shape, providing a plurality of arcuate segments of radially flat compacted powdered materials predominantly metallic and each having an outer arcuate wear face having a radius equal to the radius of the inner circumference of the backing members, placing a plurality of said segments side by side upon each of the backing members, providing a plurality of carbonaceous separator members each having an arcuate shape with an inner radius equal to the outer radius thereof and different than the inner and outer radii of the backing member and arcuate segment assemblies, assembling said segments, backing members and separator members in a furnace, and simultaneously applying heat and pressure to said members in said furnace to bond laterally adjacent segments to each other and to the adjacent backing member.

8. The process as in claim 7 further characterized by a final step of radius grinding the outer arcuate faces of the assembled segments to provide a wear face which is concentric with the inner arcuate face of the respective backing member.

9. The method of providing brake linings which comprises assembling a plurality of narrow arcuate segments of compacted friction material side by side upon a curved steel backing, taking a plurality of such assemblies each of segments and backing, and stacking them one above the other in a furnace, and applying heat and pressure to the assemblies within said furnace to bond the segments of each assembly to each other and to the adjacent backing.

10. The method as in claim 9 further characterized by providing arcuate segments which have eccentric inner and outer radii so that they are thicker at their middles than at their ends in order that the similar assemblies may nest one within the other to permit said stacking and the subsequent application of pressure without breakage.

11. The method as in claim 9 further characterized by providing uniform thickness segments and intervening inter posed separators which have eccentric inner and outer radii so that they are thicker at their middles than at their ends in order that the superposed assemblies when subjected to heat and pressure will not result in cracking of segments or of separators.

References Cited in the file of this patent
UNITED STATES PATENTS

| Number | Name | Date |
| --- | --- | --- |
| 1,892,816 | Thornburgh | Jan. 3, 1933 |
| 2,048,222 | Rehmann | July 21, 1936 |
| 2,072,070 | Fisher | Feb. 23, 1937 |
| 2,167,544 | De Bats | July 25, 1939 |
| 2,178,527 | Wellman | Oct. 31, 1939 |
| 2,282,439 | Tilden | May 12, 1942 |
| 2,331,909 | Hensel | Oct. 19, 1943 |
| 2,381,941 | Wellman et al. | Aug. 14, 1945 |
| 2,434,237 | Wellman | Jan. 6, 1948 |
| 2,446,892 | Lowey | Aug. 10, 1948 |
| 2,462,821 | Wellman | Feb. 22, 1949 |
| 2,479,364 | Jocelyn | Aug. 16, 1949 |